United States Patent
Page et al.

(10) Patent No.: US 10,747,732 B2
(45) Date of Patent: Aug. 18, 2020

(54) VIRTUAL DATABASE ADMINISTRATOR

(75) Inventors: Mike Page, Thornton, CO (US); Jeff Cox, Thornton, CO (US)

(73) Assignee: Level 3 Communications, LLC, Broomfield, CO (US)

(*) Notice: Subject to any disclaimer, the term of this patent is extended or adjusted under 35 U.S.C. 154(b) by 2948 days.

(21) Appl. No.: 11/966,540

(22) Filed: Dec. 28, 2007

(65) Prior Publication Data

US 2009/0172044 A1 Jul. 2, 2009

(51) Int. Cl.
*G06F 16/20* (2019.01)

(52) U.S. Cl.
CPC .................................. *G06F 16/20* (2019.01)

(58) Field of Classification Search
CPC ....................................................... G06F 16/20
See application file for complete search history.

(56) References Cited

U.S. PATENT DOCUMENTS

| | | | |
|---|---|---|---|
| 7,882,073 B1* | 2/2011 | Ojalvo | 707/654 |
| 2001/0027491 A1* | 10/2001 | Terretta | H04L 29/06 709/238 |
| 2003/0126133 A1* | 7/2003 | Dattatri et al. | 707/10 |
| 2003/0212660 A1* | 11/2003 | Kerwin | 707/1 |
| 2006/0047720 A1* | 3/2006 | Kulkarni et al. | 707/204 |
| 2006/0064486 A1* | 3/2006 | Baron et al. | 709/224 |
| 2007/0159897 A1* | 7/2007 | Wang | 365/200 |
| 2007/0168715 A1* | 7/2007 | Herz et al. | 714/13 |
| 2007/0198789 A1* | 8/2007 | Clark et al. | 711/162 |
| 2008/0189341 A1* | 8/2008 | Blea et al. | 707/204 |
| 2009/0125692 A1* | 5/2009 | Yamamoto et al. | 711/162 |

* cited by examiner

*Primary Examiner* — Kannan Shanmugasundaram

(57) ABSTRACT

A virtual database administrator (VDBA) is implemented in a database server network to monitor back-up write events from the database servers on the network to a network back-up server and correct failed back-up attempts. The VDBA regularly polls the database servers for copies of event logs that include information about back-up attempts. The VDBA parses each of the event logs, searching for the back-up log entries indicating successful or failed back-up writes for particular databases. For failed back-up writes, the VDBA instructs the specific database server to retry the back-up write for the particular database. The back-up retry instructions are specific to the database server and cause a back-up retry limited to the particular database on the server that experienced the failure.

17 Claims, 6 Drawing Sheets

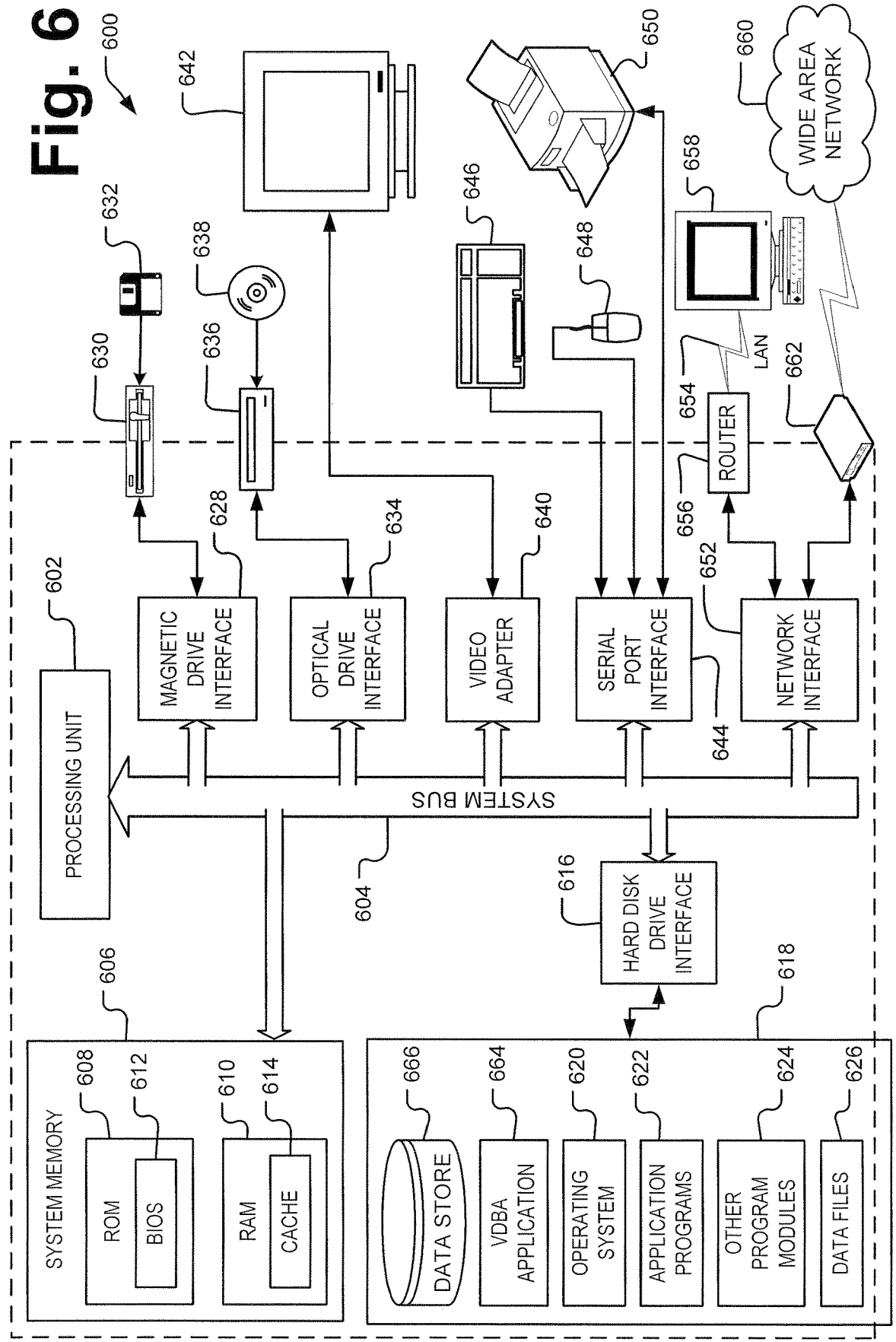

VIRTUAL DATABASE ADMINISTRATOR

BACKGROUND

1. Technical Field

The subject matter discussed herein relates to back-up processes and controls for a computer network of database servers.

2. Description of the Related Art

Some organizations employ large networks of databases in order to store, manage, and process significant amounts of information. For example, utility companies may have incredibly large amounts of information pertaining to customers, utility usage by customer, utility rates, billing information, collection information, etc. Similarly, credit card issuers and other financial companies may collect and store significant amounts of information regarding their customers including transactions, investments, portfolio holdings, trades, billing information, statement information, payment information, etc. All of this information may be distributed in databases on separate computers located throughout the organization. For example, accounts payable may be stored in a database on a computer associated with the accounts payable department while utility usage information is stored in a database on multiple computers geographically located within different regional services areas. In some organizations there may be hundreds of separate computers hosting thousands of databases for storing critical information.

All of this information needs to periodically be backed-up in order to avoid a catastrophe should one of the individual computers managing a particular database fail. In large organizations, the distributed databases are often located on data servers that are connected within the organization via a network. Common relational database networks of this type often operate using structured query language (SQL) and the computers in the network are called SQL ("sequel") servers. The network often also includes a network back-up server that provides back-up data storage for all of the database servers on the network. The back-up server is often in the form of a large tape library with robotic arms that select and install back-up tapes from the library specific to each database server when a scheduled back-up for that database occurs.

Sometimes, however, these scheduled back-up attempts fail for a variety of reasons, for example, a faulty network connection, lack of sufficient bandwidth, a tape failure, a software bug, a power failure, or any of a number of other reasons. When dealing with extremely large database networks, these failures may be regular occurrences, but may be ultimately corrected when the next scheduled back-up occurs without error. However, it is difficult to determine whether a back-up failure is an isolated or one-time error or whether there is a more significant problem that needs addressing.

Current network back-up systems have the ability to provide some forms of error notification to a live administrator, often in the form of an electronic mail ("e-mail") message. However, this information is generally limited and merely indicates a failure occurrence without an indication of why, what kind of back-up operation was attempted, or whether a later scheduled back-up attempt is successful. In the case of database servers hosting multiple databases, there is also no ability to implement a corrective back-up restricted to only the database that failed; current solutions require back-up of all databases on a particular server. A non-scheduled, fall back-up all databases on a database server could be incredibly time consuming and waste network resources. Furthermore, in very large database networks, the number of failure messages that may be generated can reach into the hundreds on a daily basis. This is an overwhelming number of potential errors for a live administrator to effectively review and investigate.

The information included in this Background section of the specification, including any references cited herein and any description or discussion thereof, is included for technical reference purposes only and is not to be regarded subject matter by which the scope of the invention is to be bound.

SUMMARY

A virtual database administrator (VDBA) may be implemented in a database server network to monitor back-up write events from the database servers on the network to a network back-up server and correct failed back-up attempts. The VDBA may regularly poll the database servers for copies of event logs that include information about back-up attempts. The VDBA parses each of the event logs, searching for the back-up log entries and then identifies whether the back-up writes for particular databases were successful or failed. Upon finding an instance of a failed back-up write, the VDBA may then instruct the specific database server to retry the back-up write for the particular database that experienced the failure. The back-up retry instructions are specific to the database server and the particular database on the server that experienced the failure. Thus, the global backup of prior options for addressing a failure is avoided and network resources are conserved.

The VDBA may be implemented in a server on the network. It may be understood as a collection of functional modules. A backup polling module requests and receives event log information from each of one or more database servers within a network. A parsing module searches the event log information and identifies event entries indicating successful and failed database back-up writes. A backup trigger module is initiated when the parsing module identifies a failed database back-up write. The backup trigger module creates a configuration file adapted to cause the specific database server experiencing the failed database back-up write to attempt a new database back-up write to correct the failed database back-up write. Upon servers hosting multiple, the configuration file is also adapted to cause the new database back-up write to be limited to only the database that experienced the back-up write failure.

In some implementations the VDBA may also poll each of the database servers for state, status, configuration, and other information regarding the operation of the particular database server and the databases hosted thereon. This information may be collected and processed by the VDBA for output to meet various reporting requirements that may be imposed on the network back-up system. In addition, upon processing such status and configuration information, the VDBA may further reset or provide new configuration parameters to a particular database server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

FIG. 6 is a schematic diagram of a general purpose computing system that may be implemented as a virtual database administrator, a database server, or a network back-up server.

DETAILED DESCRIPTION

Figure 1:
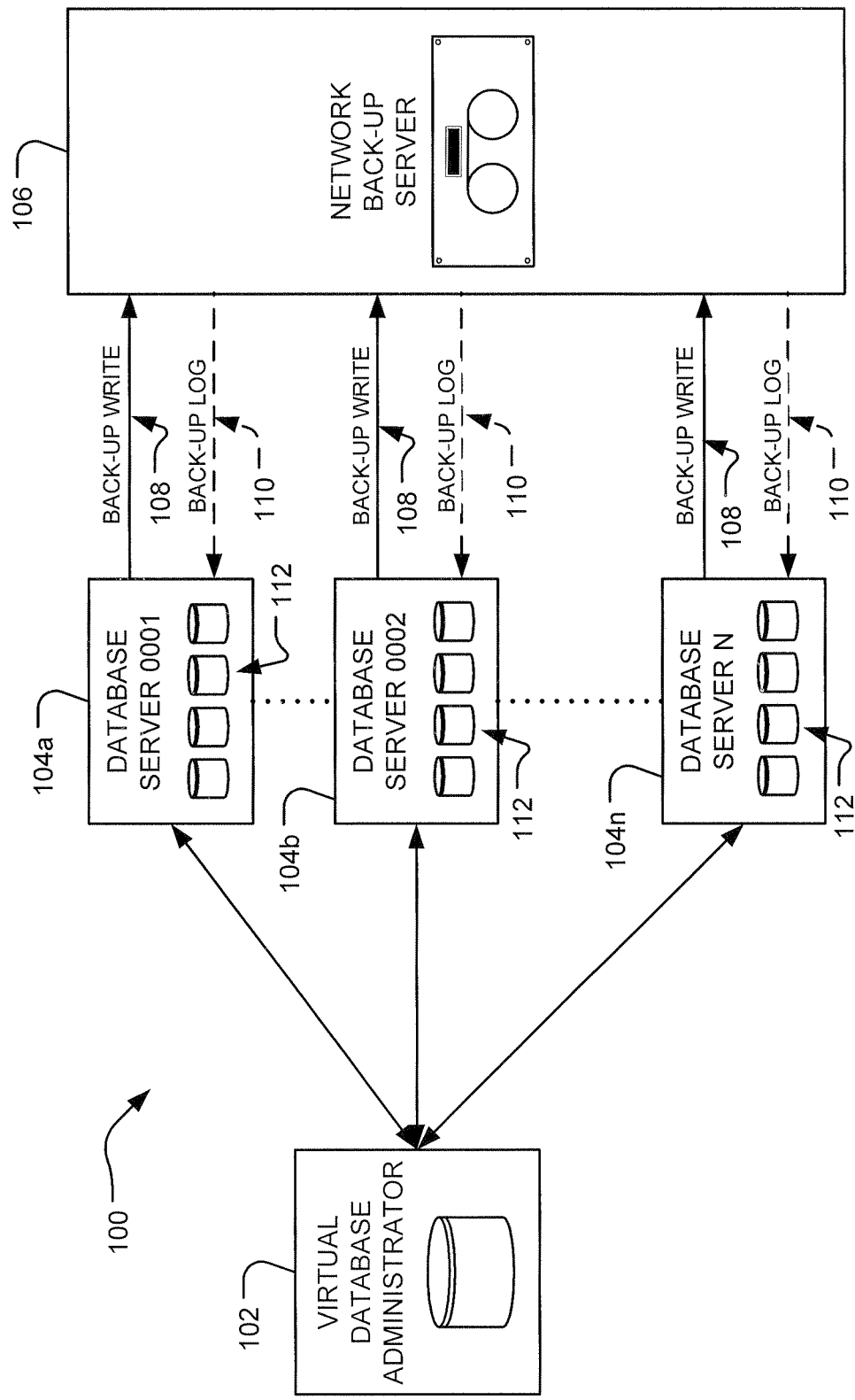
FIG. 1 is a schematic diagram of an implementation of a virtual database administrator incorporated within a network database back-up system.

A network database back-up system 100 is depicted in FIG. 1 as including a virtual database administrator (VDBA) 102. As in typical database networks, any number of database servers 104a-104n may be part of the system 100. For example, the system 100 may be composed of a handful of database servers 104a-104n or possibly hundreds of database servers 104a-104n in a large organization. Additionally, each of the database servers 104a-104n may host a plurality of separate databases 112. The database servers 104a-104n may be at a single location and connected via a local area network (LAN) or they may be at any number of locations all over the world and connected via a wide area network (WAN), for example, the Internet.

The database servers 104a-104n in the network database back-up system 100 may further be connected with a network back-up server 106 that regularly backs up the data stored in the databases 112 on each of the database servers 104a-104n. In a large organization the network back-up server 106 may be a sophisticated storage system, for example, using tape or platter media selected and switched under robotic control. In another implementation, the network back-up server 106 may be in the form of a storage area network. In smaller network systems 100, the network back-up server 106 may be in the form of a redundant array independent drive (RAID) server connected with each of the database servers 104a-104n. Various other types and implementations of network back-up servers 106 are well known and may be implemented in conjunction with the network system 100 described herein.

Generally each of the database servers 104a-104n will regularly transfer a back-up copy of the data in its databases 112 to the network back-up server 106 for safe-keeping and redundancy in the event that there is a catastrophic malfunction on a database server 104a-104n and the data is lost. Back-up writes 108 between the database servers 104a-104n to the network back-up server 106 may be regularly scheduled or they may be ad hoc. The back-up writes 108 may be initiated by the database servers 104a-104n themselves, by the network back-up server 106, or by separate administrative control not depicted in FIG. 1.

The back-up writes 108 may take several different forms, for example, frill, differential, or transactional. A full back-up means that all of the data in the databases 112 on a particular database server 104a is written to the network back-up server 106 for redundant storage. In the event that there is a significant amount of data on a particular database server 104a, a full back-up write 108 may take a very long period of time to complete, and may be dependent upon processor speed and network bandwidth. A differential back-up write is more efficient because only information in the databases 112 that has changed since the prior back-up write will be written to the network back-up server 106 in a present transmission. A transactional back-up write is also more efficient than a full back-up as again only information in the databases 112 on the database server 104 that has changed is written to the network back-up server 106. In contrast to a differential back-up, which generally occurs according to a schedule, a transactional back-up occurs each time data in the databases 112 on the database server 104a is updated.

Once a back-up write 108 is complete, the network back-up server 106 prepares a back-up log 110 that provides information about the back-up write 108. Information in the back-up log 110 may include, for example, the identity of the database 112; the start time of the back-up; the end time of the back-up; whether the back-up was full, differential, or transactional; and, most importantly, whether the back-up write 108 was a success or a failure. A back-up write 108 may fail for any number of reasons, for example, media failures, a network failure, power outages, or even because the server has been turned off or is rebooting for maintenance purposes or due to a power failure. The completed back-up log 110 is transmitted from the network back-up server 106 to the respective database server 104a that was the subject of the back-up write 108 and stored by the database server 104a as part of a much larger event log 112 that records a large number of system events that occur on the database server 104a.

The VDBA 102 may reside on a server or other computer connected with each of the database servers 104a-104n via the network. The VDBA 102 requests copies of the event logs 112 from each to the database servers 104a on a regularly scheduled basis. The VDBA 102 may poll each of the database servers 104a-104n serially in order to ensure that event logs 112 are regularly retrieved from all of the database servers 104a-104n. The VDBA parses each of the event logs 112 to look for the back-up log entries 110 from network back-up server 106 and then identifies whether the back-up writes 108 for particular databases 112 were successes or failures. Information about successful back-up writes may be stored by the VDBA 102 for reporting or other purposes.

Upon finding an instance of a failed back-up write, the VDBA 102 may determine the scope of the failure, e.g., whether the write failure was a full or partial write, and then instruct the specific database server 104a that experienced the failure to retry the back-up write 108 for the particular database to the network back-up server 106. The back-up retry instructions are specific to the database server 104a and the specific one of the databases 112 that experienced the failure. The instructions are thus surgical in that the back-up retry attempt is limited to the type of back-up procedure initially attempted and with respect to the particular database 112 that was the subject of the failed back-up write 108.

Additional implementations the VDBA 102 may also poll each of the database servers 104a-104n for state, status, configuration, and other information regarding the operation of the particular database server and the databases 112 hosted thereon. This information may be collected and processed by the VDBA 102 for output to meet various reporting requirements that may be imposed on the network back-up system 100. For example, in some organizations audit information about data integrity may be required for reporting purposes to governmental authorities. One example is the Sarbanes Oxley legislation, which has placed reporting requirements of this type on many corporations.

In addition, upon processing such status and configuration information, the VDBA 102 may further be implemented to reset or provide new configuration parameters to a particular database server 104a if the configuration information returned as part of the polling process is found to be outside of normal operational boundaries. For example, state or configuration parameters may be returned indicating that a database file on a particular database server has reached a functional limit and the VDBA 102 may therefore instruct the database server to write data to an alternate file. This allows for dynamic system changes to all database servers 104a-n in the network database system 100 without a live system administrator having to separately login to and reconfigure each of the database servers 104a-n. In addition notifications may be sent to a live system administrator when manual intervention is required.

Figure 2:
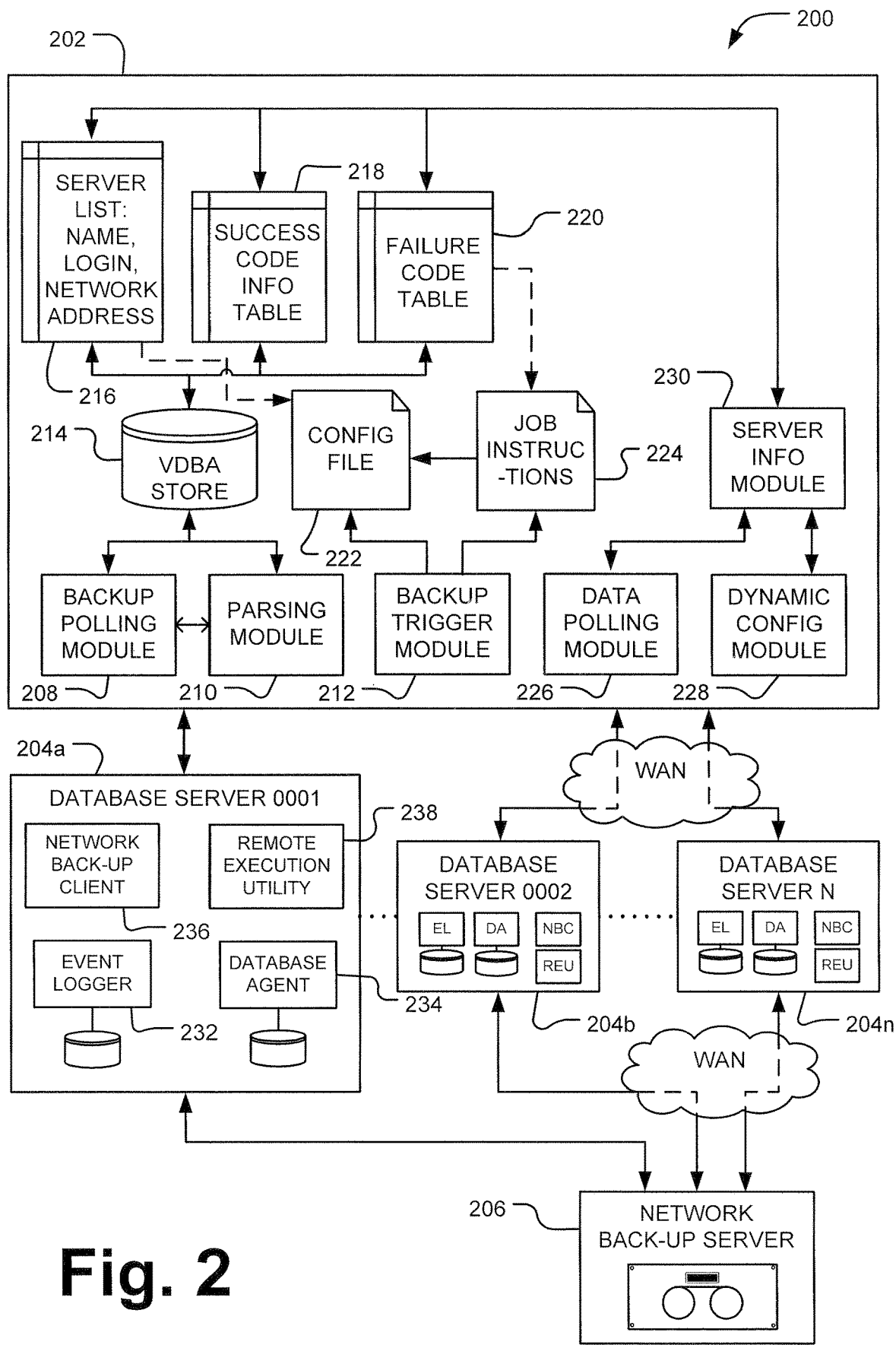
FIG. 2 is a schematic diagram of the network database back-up system of FIG. 1 detailing additional component modules of an exemplary implementation of the virtual database system.

FIG. 2 again depicts the network database back-up system 200 previously shown in FIG. 1, but provides greater detail regarding exemplary functional modules that may be implemented within the VDBA 202 and within the database servers 204a-204n in order to identify and correct back-up failures and perform any reporting functions. The back-lip functionality of the VDBA 202 may be understood through a construct of several modules providing particular functionality. In the implementation of FIG. 2, these are represented by a back-up polling module 208, and parsing module 210, and a back-up trigger module 212. These and other modules described herein may be understood as individual software applications or components of a larger software application implemented by and running on the microprocessor of the server computer performing the functions of the VDBA 202.

The back-up polling module 208 requests the event log information from each of the database servers 204a-204n on a regular basis. In one implementation, the back-up polling module 208 may sequentially request the event log information from each of the database servers 204a-204n within the network back-up system 200 in a sequential manner at predetermined time intervals. In one implementation, regular polling may occur once every 10 minutes.

The back-up polling module 208 may access a server list stored in a local database 214 associated with the VDBA 202. The server list 216 may include information including the database server name, log-in information, and a network address in order to allow the back-tip polling module 208 to communicate with a particular database server 204a. The server list may be updated regularly by an administrator in order to provide a current list of database servers 204a-204n as they are added to or removed from the network back-up system 200. Additional information may be included in the server list 216, for example, the type of back-up normally performed by a particular database server, the back-up software used by the particular database server 204a and the network back-up server 206 (e.g., Veritas, Tivoli, or other), and other information that may be useful to the back-up polling module 208 or other modules of the VDBA 202.

Once the event log data is received at the VDBA 202, it may be stored in a memory in a local database 214 for further analysis by the parsing module 210. The parsing module 210 may receive notice from the back-up polling module 208 that new event log information has been retrieved from the database servers 204a-204n. The parsing module 210 may then analyze the event log data in the local data store 214 to identify data back-up writes from the data servers 204a-204n to the network back-up server 206 and to further identify whether the back-up writes for particular databases were successful or whether there was a write failure. Information about successful back-up writes may be written to a success code information table 218 in the local database 214. Similarly back-up write failures may be written by the parsing module 210 to a failure code table 220 in the local database 214.

When the parsing module 210 identifies a failure in a back-up write, the back-up trigger module 212 may be instantiated. The back-up trigger module 212 uses information from the server list 216 to create a configuration file 222 that is understandable and implementable by a database server 204a that has experienced a back-up failure. The configuration file 222 may include the server name and log-in information of the particular database server 204a. Using additional information from the server list 216 regarding the type of back-up software used by the database server 204a with the back-up failure, the back-up trigger module 212 may create an appropriate configuration file 222 that will be recognized by the particular back-up tools on the database server 204a.

Additionally, the back-up trigger module 212 solicits information from the failure code table 220 in order to prepare unique job instructions 224 that are used by the configuration file 222 to limit the back-up retry to the particular database on the database server 204a that experienced the failure. The job instructions 224 may also include information regarding whether a full, differential, or transactional back-up write should be performed and, if the back-up write is partial in nature, identification of the range or location of the differential or transactional data that previously failed to write and should be a subject of the back-up retry. This information should be available in the failure code table 220 as a result of the identification of such information but through the analysis of the event log data by the parsing module 210.

As shown in FIG. 2, each of the database servers 204a-204n may have several components or modules that are used by the database servers 204a-204n to perform a back-up write to the network back-up server 206. As shown in exemplary database server 204a, the database servers 204a-204n may include an event logger 232, a database agent 234, a network back-up client 236, and a remote execution utility 238. As previously discussed, the event logger 232 captures information about a multiplicity of events occurring on the database server 204a, including back-up log information received from the network back-up server 206. The event logger 232 is the source of information extracted by the back-up polling module 208.

The database agent 234 is the module responsible for performing reads and writes of data to the databases on the database server 204a. One common exemplary database agent 234 is a SQL agent. The network back-up client 236 is the module that interfaces with the network back-up server 206 in order to perform the back-up writes. The network back-up client 236 also interfaces with the database agent 234 in order to read data from the databases on the database server 204a and then write the data for back-up to the network back-up server 206. An example of a common network back-up client 236 is the Net Back-up client used in the Veritas back-up system. Note that because a complete server list 216 of all the database servers 204a-204n is maintained on the VDBA 202 there is no need to update the database agent 234 or network back-up client 236 on a new server added to the network. The VDBA 202 will automatically incorporate a new server into the polling cycle and in the event of a back-up failure, develop back-up retry instructions specific to the network back-up client 236 on that new server and the databases thereon.

Additionally, a remote execution utility 238 (e.g., PS EXEC) may be provided on the database servers 204a-204n in order to provide remote control of certain functionality of the database servers 204a-204n. The remote execution utility 238 is the module that is exploited by the back-up trigger module 212. The remote execution utility 238 uses the configuration file 222 created by the back-up trigger module 212 in order to control the network back-up client 236 to retry the failed back-up write to the network back-up server 206. The configuration file 222 is specific to the configuration of the database server 204a and the corresponding job instructions 224 limit the back-up retry to the database experiencing the failure. The job instructions 224 are in a format understood by the network back-up client 236 and, together with the configuration file 222, they initiate a retry of the back-up write limited to a single database rather than all of the databases on the database servers 204a.

In addition to the back-up failure identification and back-up retry functionality of the VDBA 202, data collection for reporting and reconfiguration of the status of the database servers 204a-204n may also be performed by the VDBA 202. This functionality may be implemented by a data polling module 226, a dynamic configuration module 228, and a server information module 230. Similar to the back-up polling module 208, the data polling module 226 requests information from each of the database servers 204a-204n regarding their state, status, and/or configuration. For example, the data polling module 226 may extract information regarding the size of the hard drives on the database servers 204a-204n, the disk space consumed, the remaining disk space available, and other metric information regarding the database server 204a-204n.

This information may be passed to the server information module 230, which may use this information along with information from the server list 216, the success code table 218, and the failure code table 220 in order to provide reports for output to administrators or others. In addition, the dynamic configuration module 228 may use the information compiled by the server information module 230 in order to reconfigure the database agent 234 or other functions of the database servers 204a-204n. For example, if the dynamic configuration module 228 recognizes from the data collected by the server information module 230 that a particular database on a database server is full, it may instruct the database agent 234 to write new data to a new file. Alternately, the dynamic configuration module 228 may recognize the location (e.g., a particular data center) of a particular database server 204a and reroute a backup write to the closest network backup server. The dynamic configuration module 228 may also take action based upon a current "state" of a database server 204a. For example, more frequent backups may need to occur if the database server 204a is in a "production" state in which it is storing real generated data as opposed to a "test" or "development" state in which it may only be storing test data.

Figure 3:
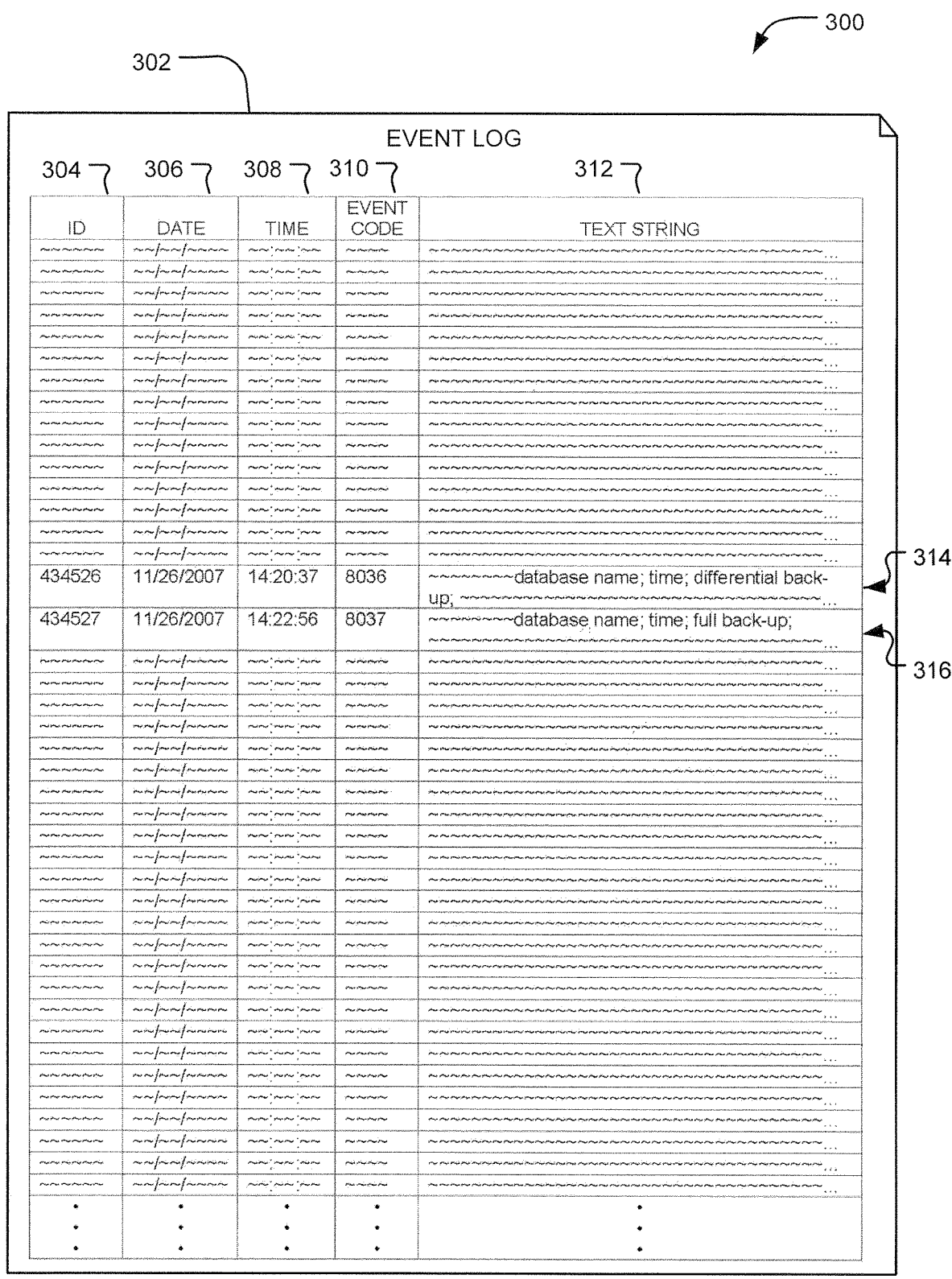
FIG. 3 is a schematic diagram of an exemplary form of an event log from a database server including back-up write information indicating the success or failure of a back-up write to a network back-tip server.

FIG. 3 depicts a typical event log file 300 that may be extracted from a database server by the back-up polling module. Each event in the event log file 300 may be composed of several fields. These fields may include data such as an event identification number 302, an event date 304, an event time 306, an event code 308, and a text string 310. In some implementations, these event fields may be separate and easily identifiable. However, in other implementations these fields may be merely part of one long text string.

As indicated in FIG. 3, the event log file 302 may be composed of numerous entries. Hundreds, perhaps thousands of entries may be generated and written into the event log file 300 on a daily basis. The job of the parsing module is to sift through all of the entries in the event log file 300 in order to identify a database write event, determine whether the back-up write was a success or failure, and extract any additional, helpful, pertinent information. Event entry 312 is an example of a successful back-up write event while event entry 314 is an example of a failed back-up write event. The parsing module searches the event entries in the event log file 300 for event codes 308 that the parsing modules recognizes as related to back-up writes and are indicative of either successful or failed back-up writes.

The successful back-up event entry 312 is identified by an event code "8036" which is understood by the parsing module to be associated with a successful back-up write event. In addition, the parsing module is configured to search through the entire associated text string and extract information desirable to for writing to the success code table or the failure code table. Exemplary information identified within the text string in the successful back-up event entry 312 is the database name, the time of the successful back-up, and an indication that the back-up was a differential back-up.

Similarly, the parsing module has identified a failed back-up event entry 314 through a known association with event code "8037." The parsing module also parses the text string to find information pertinent to the failure code table, for example, the database name, the time of the failed back-up, and an indication that the back-up was intended to be a full back-up. It should be noted that the data polling module may perform a similar search in parsing of event log information.

Once any pertinent information regarding the success or failure of a back-up event has been written to either the success code table or the failure code table, the unrelated data in the event log file 300 may be deleted from a local database associated with the VDBA. In addition to storing information about successful and failed data back-tip writes, the parsing module may save identification information regarding the last event entry reviewed so that the next time the back-up polling module requests event log data from a database server, the back-up polling module will only extract event log entries occurring after the last identified event log entry of the previous event log file 300 received.

Figure 4:
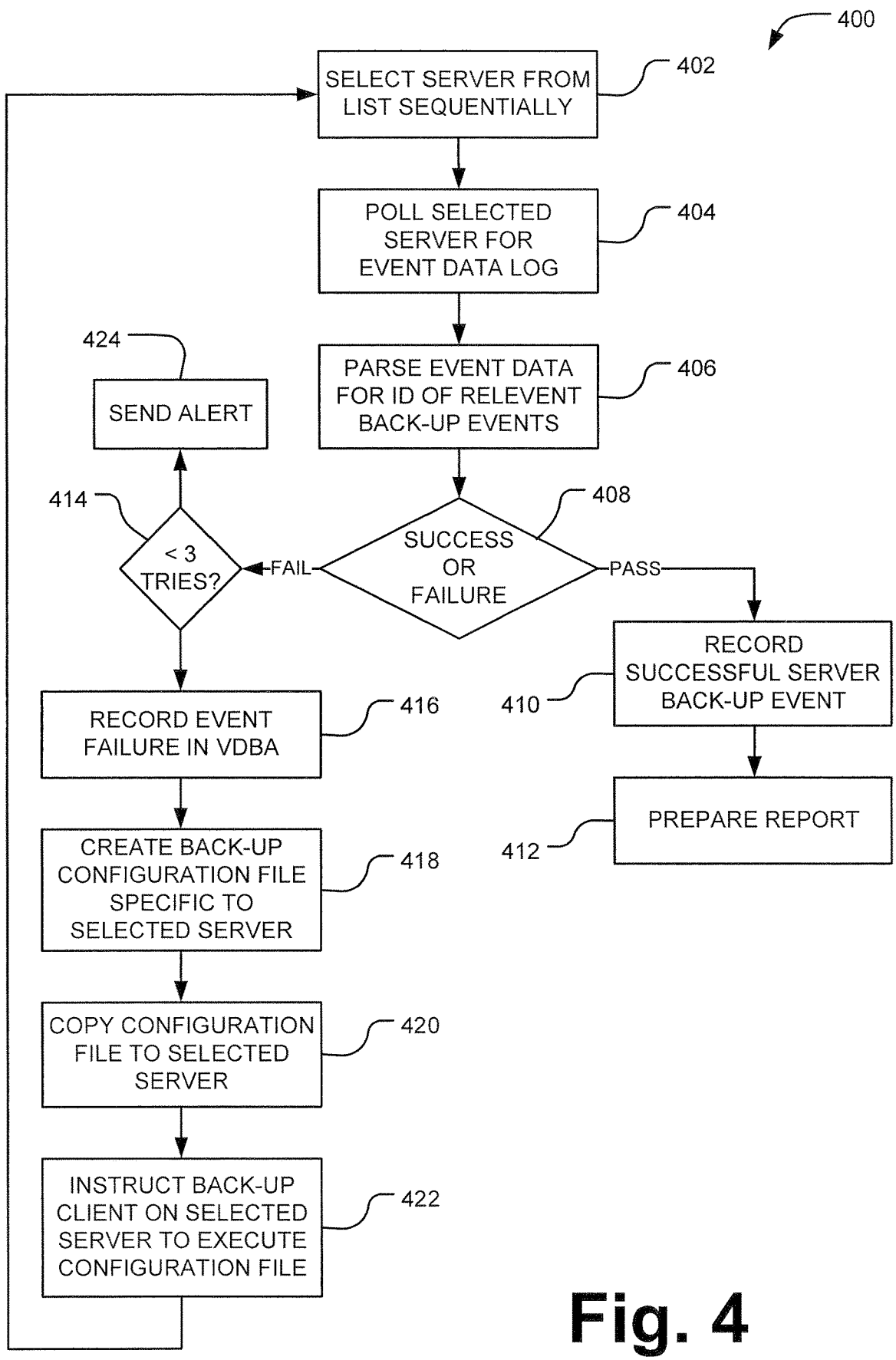
FIG. 4 is a flow diagram of an implementation of operations performed by a virtual database administrator to identify and correct back-up failures of database servers on a network.

An exemplary process 400 for identifying back-up write failures and initiating curing back-up retries is depicted in FIG. 4. The operations shown in the process 400 may be performed by the back-up polling module, the parsing module, and the back-up trigger module of the VDBA as discussed with respect to FIG. 2. This exemplary process 400 may begin with a selection operation 402 in which a database server is selected for polling from a list of all database servers connected to the database network. In this particular implementation, the database servers may be selected from the list in sequential order. In this manner, it is ensured that each of the database servers on the database network will be regularly polled by the VDBA.

Next, in a polling operation 404, the selected database server is actually polled for a copy of its event data log. As mentioned previously, the VDBA may maintain a record of the last event entry reviewed from the immediately prior poll of the event dialog for the particular database server. In this manner, only new entries in the event data log not previously reviewed will be polled and returned to the VDBA. Then in a parsing operation 406, the event entries in the data log are parsed to identify the occurrence of relevant back-up events. This may be done by searching each event entry in a data log for a particular code known to be associated with a back-up event or by searching for key words in text strings in the event data logs that indicate the occurrence of a back-up event.

Once the parsing operation 406 is complete, the back-up process 400 may perform a query operation 408 to determine whether the identified back-up event for a database was a success or failure. If the back-up write is a success, the process 400 may record information indicative of the successful server back-up event for the database in recording operation 410. Information recorded may include, for example, the date and time of the successful back-up; the particular database for which the back-up was made; whether the back-up was a full, differential, or transactional back-up; or any other pertinent information that an administrator may want to capture. Using this recorded information, the process 400 may then prepare a report in a reporting operation 412 that may be output for a variety of administrative purposes. The reporting function of the VDBA process 400 may provide any number of report formats incorporating particular fields of the recorded back-up information as needed for any particular purpose of the report.

Returning to the query operation 408, if the VDBA determines that the back-up write for a particular database was a failure, the VDBA may make a decision as to whether to attempt another back-up or escalate the failure notice to a live administrator in the event that there is a more significant problem in the database network. In the particular implementation shown in the process 400, the VDBA may attempt to retry a back-up write for a particular database up to three times as indicated in query operation 414. If the database write failure is only a first or second failure for the particular database, the process 400 may move to recording operations 416 wherein the back-up event failure is recorded by the VDBA. This recorded back-up failure information may similarly be used by any reporting functionality in the VDBA. Additionally, the failure record also acts as a counter of the number of back-up failure events for a particular database to make a determination of whether to escalate the failure problem as mentioned to above with respect to query operation 414.

In order to initiate a back-up retry for the database server experiencing failure, the VDBA may next create a back-up configuration file specific to the selected database server in creation operation 418. As part of the process of creating the configuration file, a set of job instructions specific to the particular database and failure issue are also created for use by the configuration file to initiate a limited back-up specific to the particular failing database. The configuration file is specifically designed to be recognized as an executable by the network back-up software used by the database server as well as any remote execution utility residing on the database server that may be needed to initiate a non-scheduled back-up write. Once the configuration file and job instructions are created, they are copied to the selected database server that experienced the failure in a copying operation 420. As noted, in some implementations, the VDBA may need to enlist the help of a remote execution utility to control the back-up client on the database server to execute the configuration file and job instructions as indicated in instruction operation 422. After initiating the back-up retry, the process 400 returns to the selection operation 402 to select the next server in the sequence of listed database servers on the network to identify successful or failed back-up operations on the remaining servers in the network.

As noted above, in this implementation of the exemplary process 400, the VDBA may cycle through the list of servers on a regular basis, for example, every 10 minutes. If the VDBA encounters a database server that is continually experiencing back-up write failures, then this may be an indication that there is a serious problem that needs to be investigated. As shown in the implementation of FIG. 4 in query operation 414, if a back-up write for a particular database server fails after three tries, the VDBA may send an alert to a live administrator. This alert may be in the form of an e-mail message, a pre-recorded audio and/or video message, a visual or audible warning, or any other method of alert as indicated in alerting operation 424. Such an alert will allow a live administrator to troubleshoot the particular database server, the network back-up server, or the network connection between the database servers in order to identify any problems that may be preventing back-up write from succeeding. Potential issues could be, for example, a hardware or software error, an unplugged network cable, a failure of a router or wireless access link, insufficient memory space, a power failure, or any of a number of other problems that could prevent a successful back-up write. Once the alert is generated in the alerting operation 424, the process 400 may continue to cycle through and poll each of the database servers on the network to identify and correct back-up failures as they occur.

Figure 5:
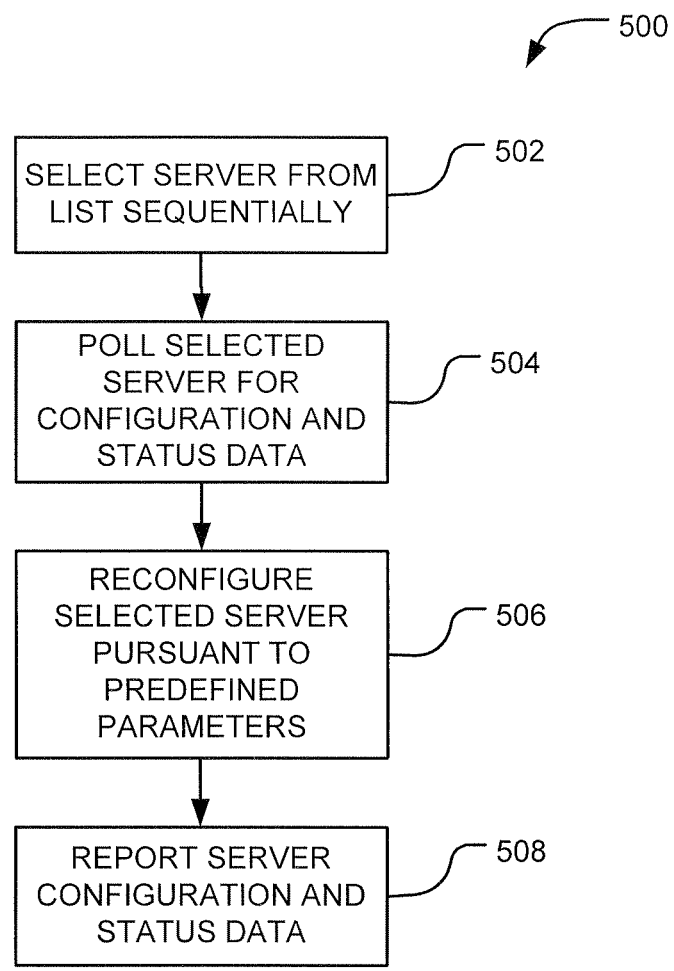
FIG. 5 is a flow diagram of an implementation of operations performed by a virtual database administrator to identify and report the status and configuration of database servers within a network.

FIG. 5 depicts an exemplary process 500 that may be performed by an implementation of the VDBA to provide channel reporting information about a network of database servers. In a selection operation 502 the VDBA may select a database server on the network from a list of servers in order to collect information from that particular server. As with respect to the back-up failure identification and correction process of FIG. 4, the database servers may be ordered in a list and selected sequentially to ensure that data is retrieved from each of the database servers on a regular bases. In some implementations, the reporting process 500 need not be as frequent as the back-up failure determination process and may be implemented, for example, on a daily or weekly basis.

Once the database server has been selected, it may be polled by the VDBA for configuration and status data in polling operation 504. This data may include information like the size of the data storage drive on the database server, the disk space presently consumed by data, and the disk space still available for storage of additional data. This information on disk space usage may be used to forecast future disk needs and address budget concerns. Other information that may be collected may include an identification of the version of the database software. This information could be used to identify whether the database server is running the most recent version of the software build or whether its antiviral profiles are up to date. Further, on a macro scale, information about software versions across all of the database servers in the network could be used for license compliance purposes. If more database servers are on the networks running software than licenses purchased by the organization, this could indicate to the live administrator that additional licenses need to be purchased. Alternatively, if fewer servers are using the software than the total licensed number, the live administrator could use this information to reduce the number of licenses purchased for the following renewal period, thus saving the organization money. Information about users and security role information may also be collected for both internal audit and regulatory compliance.

In addition to merely collecting data from the database servers, the process 500 may optionally analyze the collected information and send reconfiguration instructions to a selected database server if it is determined that there is a problem with the present status or configuration of the selected database server in reconfiguration operation 506. Such a determination may be made by comparison of the configuration data collected with predefined parameters for optimal configuration of the database server used by the VDBA. In one implementation in a database network of SQL servers, reconfiguration operations may be performed by using Windows Management Interface (WMI) scripts. At the present time no additional configurations are achieved through WMI, but future work of any one of the 100's of WMI namespaces may be advantageously used for reconfiguration purposes. Possible uses of WMI may be to analyze the registry of a database server to search for known security loopholes, or to check file/folder structures for consistency across the organization. Other uses may include determining the length of continuous operation of the database server or whether the database server it is missing any critical operating system updates. Finally, one or more reports regarding the server configuration and status may be generated by the VDBA in reporting operation 508 for use by live administrators to meet various reporting requirements.

An exemplary computer system 600 for implementing the database server back-up failure identification, back-up retry, and reporting processes above is depicted in FIG. 6. The computer system 600 may be in the form of server computers, personal computers (PC), or other special purpose computers with internal processing and memory components as well as interface components for connection with external input, output, storage, network, and other types of peripheral devices. Alternatively, the computer system 600 may be in the form of any of a notebook or portable computer, a tablet PC, a handheld media player (e.g., an MP3 player), a smart phone device, a video gaming device, a set top box, a workstation, a mainframe computer, a distributed computer, an Internet appliance, or other computer devices, or combinations thereof. Internal components of the computer system in FIG. 6 are shown within the dashed line and external components are shown outside of the dashed line. Components that may be internal or external are shown straddling the dashed line.

The computer system 600 includes a processor 602 and a system memory 606 connected by a system bus 604 that also operatively couples various system components. There may be one or more processors 602, e.g., a single central processing unit (CPU), or a plurality of processing units, commonly referred to as a parallel processing environment. The system bus 604 may be any of several types of bus structures including a memory bus or memory controller, a peripheral bus, a switched-fabric, point-to-point connection, and a local bus using any of a variety of bus architectures. The system memory 606 includes read only memory (ROM) 608 and random access memory (RAM) 610. A basic input/output system (BIOS) 612, containing the basic routines that help to transfer information between elements within the computer system 600, such as during start-up, is stored in ROM 608. A cache 614 may be set aside in RAM 610 to provide a high speed memory store for frequently accessed data.

A hard disk drive interface 616 may be connected with the system bus 604 to provide read and write access to a data storage device, e.g., a hard disk drive 618, for nonvolatile storage of applications, files, and data. A number of program modules and other data may be stored on the hard disk 618, including an operating system 620, one or more application programs 622, other program modules 624, and data files 626. In an exemplary implementation, the hard disk drive 618 may further store the VDBA application 664 and its corresponding modules. The hard disk drive 618 may additionally contain a data store 666 for maintaining the success and failure tables and other database server information described above. Note that the hard disk drive 618 may be either an internal component or an external component of the computer system 600 as indicated by the hard disk drive 618 straddling the dashed line in FIG. 6. In some configurations, there may be both an internal and an external hard disk drive 618.

The computer system 600 may further include a magnetic disk drive 630 for reading from or writing to a removable magnetic disk 632, tape, or other magnetic media. The magnetic disk drive 630 may be connected with the system bus 604 via a magnetic drive interface 628 to provide read and write access to the magnetic disk drive 630 initiated by other components or applications within the computer system 600. The magnetic disk drive 630 and the associated computer-readable media may be used to provide nonvolatile storage of computer-readable instructions, data structures, program modules, and other data for the computer system 600.

The computer system 600 may additionally include an optical disk drive 636 for reading from or writing to a removable optical disk 638 such as a CD ROM or other optical media. The optical disk drive 636 may be connected with the system bus 604 via an optical drive interface 634 to provide read and write access to the optical disk drive 636 initiated by other components or applications within the computer system 600. The optical disk drive 630 and the associated computer-readable optical media may be used to provide nonvolatile storage of computer-readable instructions, data structures, program modules, and other data for the computer system 600.

A display device 642, e.g., a monitor, a television, or a projector, or other type of presentation device may also be connected to the system bus 604 via an interface, such as a video adapter 640 or video card. Similarly, audio devices, for example, external speakers or a microphone (not shown), may be connected to the system bus 604 through an audio card or other audio interface (not shown).

In addition to the monitor 642, the computer system 600 may include other peripheral input and output devices, which are often connected to the processor 602 and memory 606 through the serial port interface 644 that is coupled to the system bus 606. Input and output devices may also or alternately be connected with the system bus 604 by other interfaces, for example, a universal serial bus (USB), a parallel port, or a FireWire (IEEE 1394) port. A user may enter commands and information into the computer system 600 through various input devices including, for example, a keyboard 646 and pointing device 648, for example, a mouse. Other input devices (not shown) may include, for example, a microphone, a joystick, a game pad, a tablet, a touch screen device, a satellite dish, a scanner, a facsimile machine, and a digital camera, and a digital video camera. Other output devices may include, for example, a printer 650, a plotter, a photocopier, a photo printer, a facsimile machine, and a press (the latter not shown). In some implementations, several of these input and output devices may be combined into a single device, for example, a printer/scanner/fax/photocopier. It should also be appreciated that other types of computer-readable media and associated drives for storing data, for example, magnetic cassettes or flash memory drives, may be accessed by the computer system 600 via the serial port interface 644 (e.g., USB) or similar port interface.

The computer system 600 may operate in a networked environment using logical connections through a network interface 652 coupled with the system bus 604 to communicate with one or more remote devices. The logical connections depicted in FIG. 6 include a local-area network (LAN) 654 and a wide-area network (WAN) 660. Such networking environments are commonplace in home networks, office networks, enterprise-wide computer networks, and intranets. These logical connections may be achieved by a communication device coupled to or integral with the computer system 600. As depicted in FIG. 6, the LAN 654 may use a router 656 or hub, either wired or wireless, internal or external, to connect with remote devices, e.g., a remote computer 658, similarly connected on the LAN 654. The remote computer 658 may be another personal computer, a server, a client, a peer device, or other common network node, and typically includes many or all of the elements described above relative to the computer system 600.

To connect with a WAN 660, the computer system 600 typically includes a modem 662 for establishing communications over the WAN 660. Typically the WAN 660 may be the Internet. However, in some instances the WAN 660 may be a large private network spread among multiple locations. The modem 662 may be a telephone modem, a high speed modem (e.g., a digital subscriber line (DSL) modem), a cable modem, or similar type of communications device. The modem 662, which may be internal or external, is connected to the system bus 618 via the network interface 652. In alternate embodiments the modem 662 may be connected via the serial port interface 644. It should be appreciated that the network connections shown are exemplary and other means of and communications devices for establishing a communications link between the computer system and other devices or networks may be used. Connection of the computer system 600 with a LAN 654 or WAN 660 allows the VDBA program 662 the ability to communicate with the database servers similarly connected to the LAN 654 or WAN 660 to identify database write failures and implement retry operations.

Although various embodiments of this invention have been described above with a certain degree of particularity, or with reference to one or more individual embodiments, those skilled in the art could make numerous alterations to the disclosed embodiments without departing from the spirit or scope of this invention. All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A method on a computer of administering a plurality of database servers connected within a network comprising:
   requesting event log information from each of the plurality of database servers within the network, the database servers each comprising one or more databases;
   receiving the requested event log information;
   parsing the event log information to identify one or more of an event entry indicating a successful database back-up write and an event entry indicating a failed database back-up write to a first network back-up server;
   creating, upon identification of the failed database back-up write, a configuration file adapted to cause a specific database server experiencing the failed database back-up write to attempt a new database back-up write to correct the failed database back-up write;
   transmitting the configuration file to the specific database server;
   requesting configuration information from the specific database server, wherein the configuration information comprises at least a state of the specific database server;
   receiving the configuration information from the specific database server; and
   altering, based on the configuration information, a frequency of the new database back-up write.

2. The method of claim 1, wherein
   the specific database server hosts a plurality of databases; and
   the failed database back-up write occurred with respect to a single one of the plurality of databases; the method further comprising:
   adapting the configuration file to cause the specific database server to attempt the new database back-up, wherein the new database back-up write is limited to the single one of the plurality of databases.

3. The method of claim 1 further comprising initiating an alert to a live administrator when the failed database back-up write for the specific database server meets a threshold condition.

4. The method of claim 3 wherein the threshold condition is a certain number of occurrences of the failed database back-up write.

5. The method of claim 1 further comprising recording data from the event entries related to occurrences of the successful database back-up write and the failed database back-up write in a data store.

6. The method of claim 1 further comprising
   generating a report incorporating information from one or more of the event entries, the configuration information, or both.

7. A non-transitory computer readable medium comprising computer executable instructions for causing a computer to perform operations comprising:

requesting event log information from each of a plurality of database servers within a network, the database servers each comprising one or more databases;

receiving the requested event log information;

parsing the event log information to identify one or more of an event entry indicating a successful database back-up write and an event entry indicating a failed database back-up write to a first network back-up server;

creating, upon identification of the failed database back-up write, a configuration file adapted to cause a specific database server experiencing the failed database back-up write to attempt a new database back-up write to correct the failed database back-up write;

transmitting the configuration file to the specific database server;

requesting configuration information from the specific database server, wherein the configuration information comprises at least a state of the specific database server;

receiving configuration information from the specific database server; and altering, based on the configuration information, a frequency of the new database back-up write.

8. The non-transitory computer readable medium of claim 7, wherein when the specific database server hosts a plurality of databases; and the failed database back-up write occurred with respect to a single one of the plurality of databases; the instructions further comprise the following operation:

adapting the configuration file to cause the specific database server to attempt a new database back-up write limited to the single one of the plurality of databases.

9. The non-transitory computer readable medium of claim 7, wherein the instructions further comprise the following operation:

initiating an alert to a live administrator when the failed database back-up write for the specific database server meets a threshold condition.

10. The non-transitory computer readable medium of claim 9, wherein the threshold condition is a certain number of occurrences of the failed database back-up write.

11. The non-transitory computer readable medium of claim 7, wherein the instructions further comprise the following operation:

recording data from the event entries related to occurrences of the successful database back-up write and the failed database back-up write in a data store.

12. The non-transitory computer readable medium of claim 7, wherein the instructions further comprise the following operations:

generating a report incorporating information from one or more of the event entries, the configuration information, or both.

13. A system of administering a plurality of database servers connected within a network comprising:

at least one processor; and memory, operatively connected to the at least one processor and including instructions that, when executed by the at least one processor, cause the system to perform a method, the method comprising:

requesting event log information from each of the plurality of database servers within the network, the database servers each comprising one or more databases;

receiving the requested event log information;

parsing the event log information to identify one or more of an event entry indicating a successful database back-up write and an event entry indicating a failed database back-up write to a first network back-up server;

creating, upon identification of the failed database back-up write, a configuration file adapted to cause a specific database server experiencing the failed database back-up write to attempt a new database back-up write to correct the failed database back-up write;

transmitting the configuration file to the specific database server;

requesting configuration information from the specific database server, wherein the configuration information comprises at least a state of the specific database server;

receiving the configuration information from the specific database server; and altering, based on the configuration information, a frequency of the new database back-up write.

14. The system of claim 13, wherein the method further comprises initiating an alert to a live administrator when the failed database back-up write for the specific database server meets a threshold condition.

15. The system of claim 14, wherein the threshold condition is a certain number of occurrences of the failed database back-up write.

16. The system of claim 13, wherein the method further comprises recording data from the event entries related to occurrences of the successful database back-up write and the failed database back-up write in a data store.

17. The system of claim 13, wherein the method further comprises:

generating a report incorporating information from one or more of the event entries, the configuration information, or both.

* * * * *